United States Patent

[19]

Bender

[11] Patent Number: 6,023,381

[45] Date of Patent: Feb. 8, 2000

[54] MICROSCOPE OBJECTIVE HAVING A CORRECTION HOLDER

[75] Inventor: Reinhold Bender, Solms, Germany

[73] Assignee: Leica Mikroskopie und Systeme GmbH, Wetzlar, Germany

[21] Appl. No.: 09/119,647

[22] Filed: Jul. 21, 1998

[30] Foreign Application Priority Data

Feb. 5, 1998 [DE] Germany .............................. 198 04 470

[51] Int. Cl.[7] .............................. G02B 7/02; G02B 21/00
[52] U.S. Cl. .......................... 359/823; 359/368; 359/656; 359/821
[58] Field of Search ..................... 359/362, 368, 359/378–380, 383–384, 656–661, 811–819, 823–830, 694–706

[56] References Cited

U.S. PATENT DOCUMENTS

| | | | |
|---|---|---|---|
| 4,059,342 | 11/1977 | Tojyo | 359/658 |
| 4,199,227 | 4/1980 | Uesugi et al. | 359/701 |
| 4,208,101 | 6/1980 | Trapp et al. | 359/656 |
| 4,411,498 | 10/1983 | Muryoi | 359/704 |
| 4,953,962 | 9/1990 | Esswein et al. | 359/660 |
| 4,993,815 | 2/1991 | Yamazaki et al. | 359/699 |
| 5,245,476 | 9/1993 | Shono et al. | 359/699 |
| 5,561,562 | 10/1996 | Bender | 359/823 |
| 5,856,886 | 1/1999 | Kaizu | 359/823 |

FOREIGN PATENT DOCUMENTS

| | | | |
|---|---|---|---|
| 278 208 | 4/1990 | Germany | 359/656 |
| 40 08 154 C2 | 9/1995 | Germany . | |

*Primary Examiner*—Thong Nguyen
*Attorney, Agent, or Firm*—Foley & Lardner

[57] ABSTRACT

A microscope objective having a plurality of lens assembly holders, one of which is designed as a correction holder (F4) for matching to different cover slip thicknesses and can be moved axially along the optical axis of the objective for position changing between lens assembly holders which are stationary relative to the objective. A cam ring (6) is arranged within the holder support (1) such that it can rotate. The correction holder (F4) is supported by means of a ball (11) or a bolt (24) on its cam (7). A pin (14), which can move radially in a holder support, is firmly connected at its one end to the cam ring (6), and its other end extends into a knurled ring (16). Turning the cam ring (6) by means of the knurled ring (16) changes the support point between the correction holder (F4) and the cam (7) of the cam ring (6), resulting in the correction holder (F4) being moved exclusively in the axial direction.

9 Claims, 3 Drawing Sheets

MICROSCOPE OBJECTIVE HAVING A CORRECTION HOLDER

BACKGROUND OF THE INVENTION

The present invention relates to a microscope objective having a plurality of lens assembly holders, wherein at least one of them is designed as a correction holder.

German Patent No. 43 23 721 discloses a microscope objective designed to adjust to accommodate different cover slip thicknesses. It has a plurality of lens assembly holders, one of which is designed as a correction holder for accommodating different cover slip thicknesses. The correction holder can be moved axially between other lens assembly holders, which are stationary relative to the objective. For position changing, the correction holder carries out an axial movement along the optical axis of the microscope objective and, at the same time, a radial rotation about the optical axis of the microscope objective. To produce such movement of the correction holder, a pin is arranged at a right angle to the optical axis of the objective, and this pin is arranged on a cam groove in a holder support such that it can be moved by means of a knurled ring. One end of the pin is firmly connected to the correction holder, and the other end engages in an internal groove in the knurled ring. This groove is parallel to the optical axis of the microscope objective. By rotating this ring, the pin moves on the cam and moves axially in accordance with the cam profile. As a result of this movement, the correction holder carries out an axial movement and, at the same time, a radial rotation.

SUMMARY OF THE INVENTION

It is therefore an object of the present invention to provide an improved microscope objective.

A further object of the invention is to provide a microscope objective of the type mentioned above in which the correction holder carries out only an axial movement within the holder support.

Still another object of the invention resides in providing a microscope objective in which no tilting occurs during adjustment.

It is a further object of the invention to provide an improved microscope including the microscope objective according to the invention. In accomplishing these objects according to the present invention, there has been provided a microscope objective comprising: a holder support; a plurality of lens assembly holders, contained in the holder support and including at least one stationary lens assembly holder that is stationary relative to the holder support and at least one correction lens assembly holder that is axially movable along an optical axis of the objective for position changing relative to said stationary lens assembly holder; a cam ring ratably arranged in connection with the holder support, said cam ring having a cam surface on which the correction lens assembly holder is supported; an adjusting ring ratably mounted on the holder support; and a connecting member connected at one end to the cam ring and at its other end to the adjusting ring.

In further accomplishing the objects according to the present invention, there has been provided a microscope comprising a microscope objective as defined above.

Further objects, features and advantages of the present invention will become apparent from the detailed description of the preferred embodiments that follows, when considered in conjunction with the attached figures of drawing.

BRIEF DESCRIPTION OF THE DRAWINGS

The subject matter of the invention is explained in more detail in the following text with reference to exemplary embodiments and with reference to the drawings, in which.

DETAILED DESCRIPTION OF THE PREFERRED EMBODIMENTS

Figure 1:
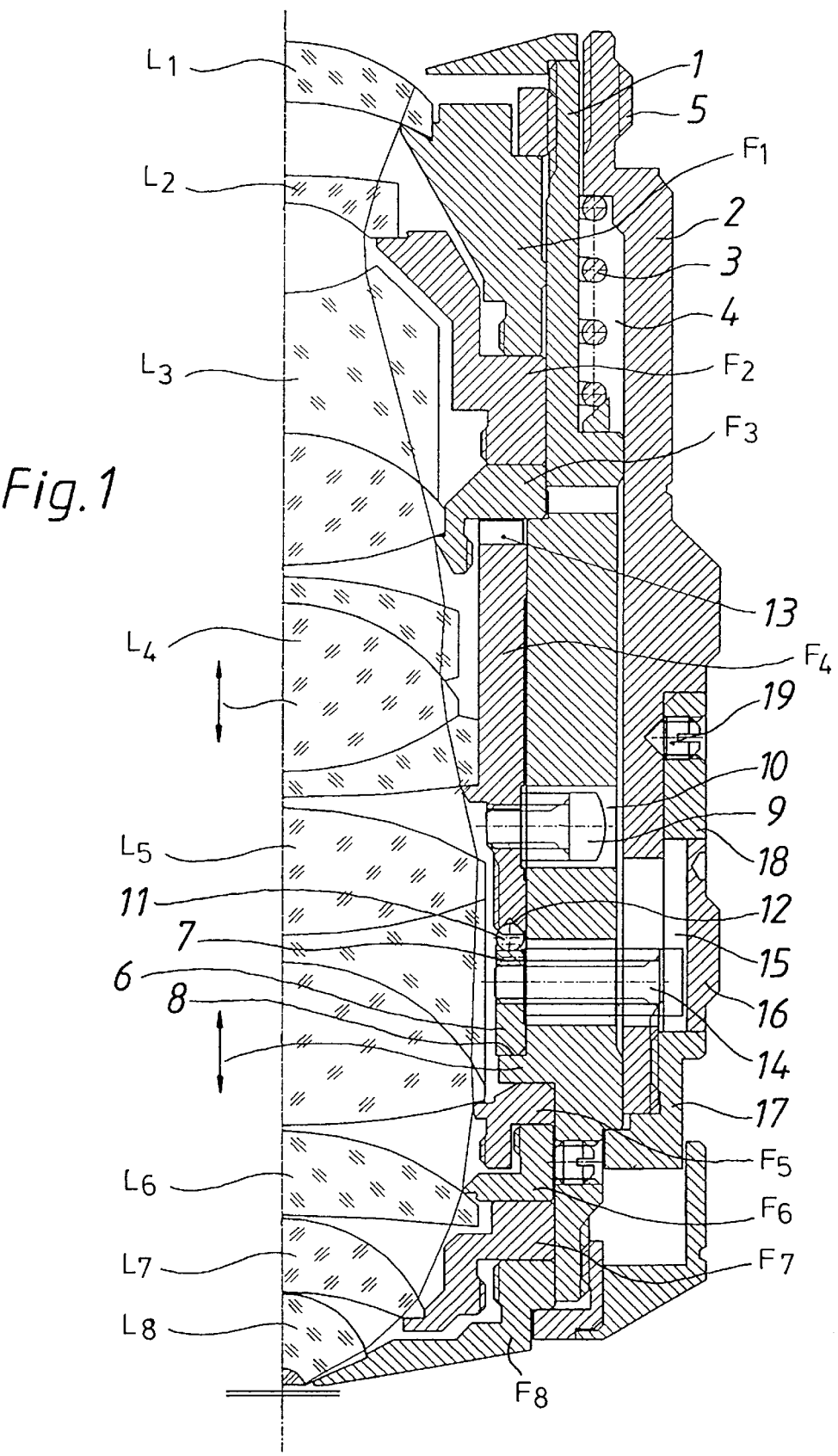
FIG. 1 shows a partial longitudinal section of one embodiment of an objective according to the invention, having a correction holder.

The objective shown in FIG. 1 has eight lens assemblies L1–L8, which are mounted in holders F1–F8. With the exception of the axially movable correction holder F4 for the lens assembly L4, which is used as the correction lens assembly, all the holders are firmly connected to a cylindrical holder support 1. The holder support 1 is arranged in a cylindrical holding part 2 such that it can be moved axially against the prestressing from a compression spring 3. The compression spring 3 is arranged in an annular space 4 between the holder support 1 and the holding part 2, and is supported on both of them. A tightening thread 5 on the holding part 2 is used to mount the objective on an objective holder (which is not illustrated) of a microscope. The axial mobility of the holder support 1 relative to the holding part 2 provides specimen protection.

A cam ring 6 is arranged in the holder support 1 such that it can rotate radially. One of its end surfaces is designed as a cam 7, and its other end surface 8 is supported on the holder support 1.

The correction holder F4 of the lens assembly L4 is arranged such that it can be moved axially but is fixed in rotation. To prevent the correction holder F4 from being rotated, a guide pin 9 is mounted on it, at a right angle to the optical axis. The free end of the guide pin 9 is guided in a groove 10 which extends parallel to the optical axis, so that no radial rotating of the correction holder F4 is possible.

The correction holder F4 is supported by a ball 11 on the end of cam 7 of the cam ring 6. This ball 11 is arranged between the cam 7 and the correction holder F4 to reduce the friction resistance in the event of any relative rotation between these two parts. The correction holder F4 is provided in its end surface facing the cam ring 6 with a conical recess 12 which partially holds, and thus fixes, the ball 11. Reliable contact between the ball 11 and the cam 7 and/or the correction holder F4 is ensured by a resilient element, which prestresses the correction holder F4 in the direction of the cam ring 6. In this case, this element is a corrugated spring 13 which is arranged between the correction holder F4 and the holder support 1.

A pin 14 is screwed into the cam ring 6 at a right angle to the optical axis. The pin 14 extends through the holder support 1, and its free end engages in an internal groove 15 in a knurled ring 16. Groove 15 is parallel to the optical axis. The knurled ring 16 is held in the axial direction by a front screw sleeve 17 which is connected to the holding part 2. An adjusting ring 18, which is fixed on the holding part 2 by a screw 19, is used to set the knurled ring 16 to a specific cover slip thickness.

When the knurled ring 16 is operated, the cam ring 6 is rotated about the optical axis, as a result of the fact that the pin 14 is engaged in the internal groove 15 in the knurled ring 16. As a result of this rotation, the ball 11 (which rolls on the cam 7 of the cam ring 6) changes its position on the cam 7, resulting in the ball 11 being moved in the axial direction. This axial movement of the ball 11 is followed (without any rotation about the optical axis of the objective) by the correction holder F4, which is supported on the ball 11. This results in the correction holder F4 being moved exclusively in the axial direction within the holder support 1, very smoothly and without any sticking.

Figure 2:
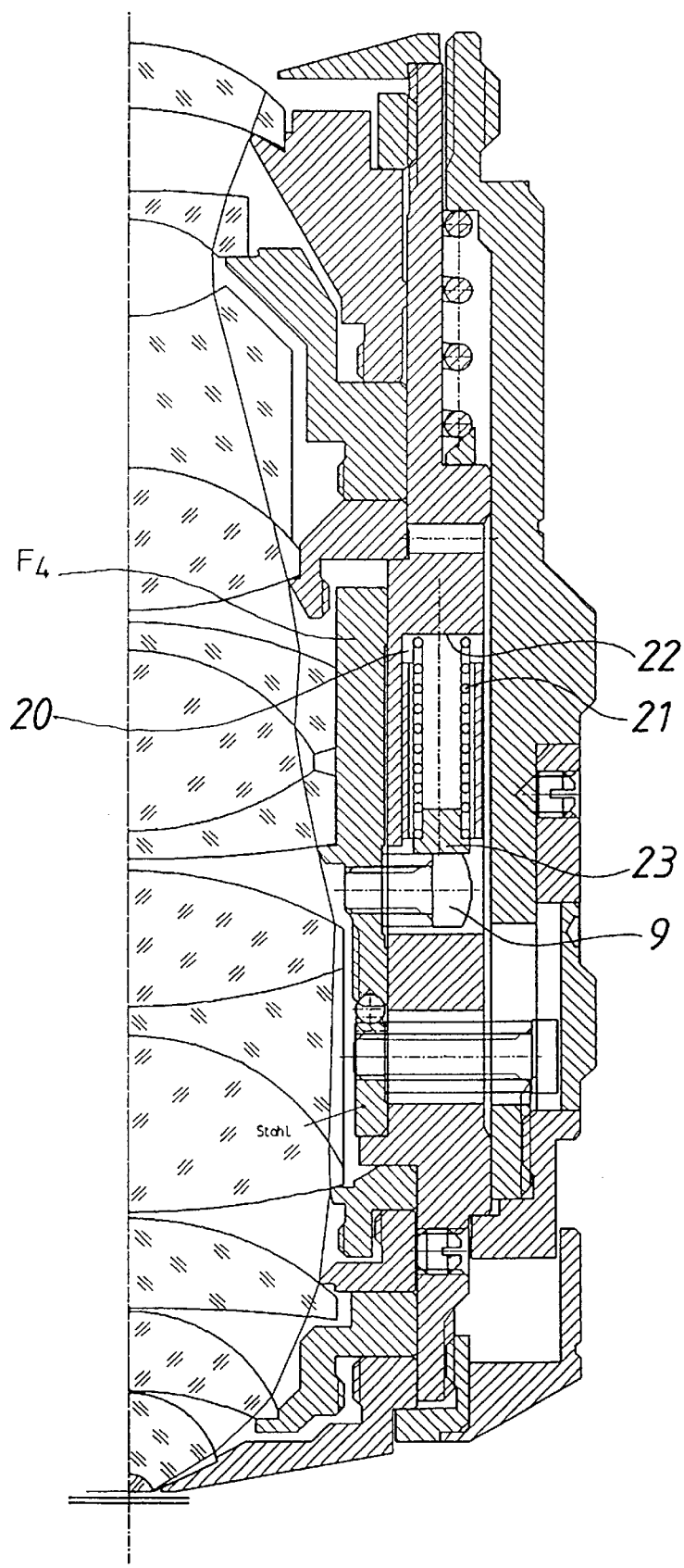
FIG. 2 shows a partial longitudinal section of another embodiment of an objective according to the invention, having a correction holder.

The embodiment of an objective according to the invention that is illustrated in FIG. 2 differs from the preceding embodiment by the nature of the prestressing of the correction holder F4 in the direction of the cam ring 6. In this embodiment, the longitudinal groove in the holder support 1 for the guide pin 9 of the correction holder F4 is lengthened in the direction of the fixing end of the objective. This lengthened longitudinal groove 20 has a compression spring 21 arranged in it. One end of the spring 21 is supported on the end wall 22 of the longitudinal groove 20, and its other end is supported on the guide pin 9. To be more precise, the other end of spring 21 is supported on a nipple 23 which is arranged between the guide pin 9 and the compression spring end to improve the positive locking. In comparison to the corrugated spring 13 used in FIG. 1, the compression spring 21 has the advantage of providing a uniform spring force over a greater adjustment range. In addition, the spring force acts specifically on the guide pin 9, additionally precluding any tilting of the correction holder F4.

Figure 3:
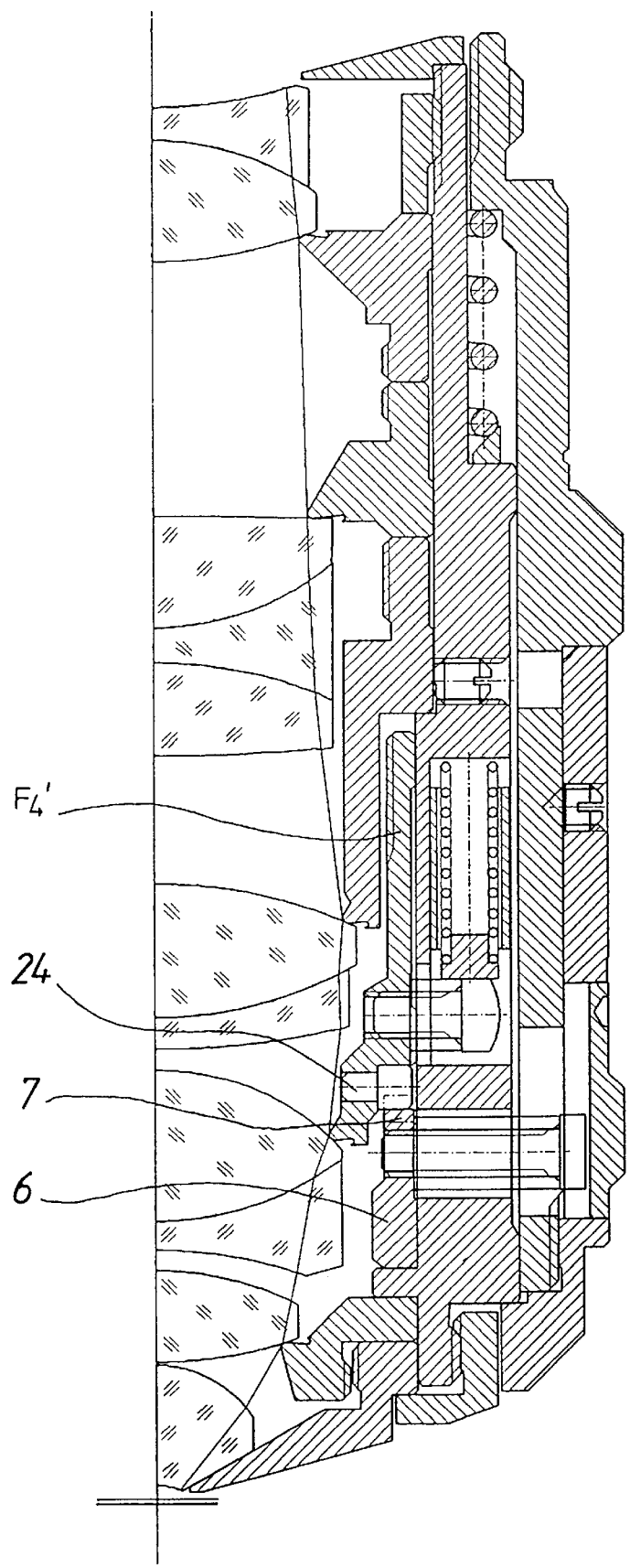
FIG. 3 shows a partial longitudinal section of yet another embodiment of an objective according to the invention, having a correction holder.

The embodiment of an objective illustrated in FIG. 3 differs from the embodiment according to FIG. 2 essentially by virtue of the nature of the engagement between the correction holder F4' (which is designed differently in this case) and the cam 7 of the cam ring 6. Instead of a ball, a bolt 24 is mounted, at a right angle to the optical axis of the objective, on the correction holder F4'. The cylindrical surface of bolt 24 rests on the cam 7 of the cam ring 6. Bolt 24 supports the correction holder F4' on the cam ring 6.

The entire contents of German Patent Application No. 198 04 470.4, filed Feb. 5, 1998, are hereby incorporated by reference.

The invention has been described and illustrated with reference to certain preferred embodiments. It will be understood by those skilled in this art that obvious changes and modifications to these preferred embodiments are possible and are to be considered as being encompassed within the present invention.

What is claimed is:

1. A microscope objective comprising:
   a holder support;
   a plurality of lens assembly holders, contained in the holder support and including at least one stationary lens assembly holder that is stationary relative to the holder support and at least one correction lens assembly holder that is axially movable along an optical axis of the objective for position changing relative to said stationary lens assembly holder;
   a cam ring rotatably arranged in connection with the holder support, said cam ring having a cam surface on which the correction lens assembly holder is supported;
   an adjusting ring rotatably mounted on the holder support;
   a connecting member connected at one end to the cam ring and at its other end to the adjusting ring;
   a guide member that extends at a right angle to the optical axis and is mounted on the correction lens assembly holder; and
   a resilient member having one end supported on the holder support and the other end acting on the guide member.

2. A microscope objective as claimed in claim 1, further comprising a ball member supporting the correction holder lens assembly on the cam surface of the cam ring.

3. A microscope objective as claimed in claim 2, wherein the correction lens assembly holder further comprises a conical recess for at least partially holding and positioning the ball.

4. A microscope objective as claimed in claim 1, further comprising a bolt member extending at a right angle to the optical axis on the correction lens assembly holder, and wherein the correction lens assembly holder is supported on the cam surface of the cam ring by the bolt member.

5. A microscope objective as claimed in claim 1, wherein said guide member has a free end extending into a groove that extends parallel to the optical axis in the holder support, whereby the correction lens assembly holder is restrained from rotation.

6. A microscope objective as claimed in claim 1, wherein said resilient member includes a compression spring.

7. A microscope objective as claimed in claim 1, wherein the connecting member comprises a pin member.

8. A microscope objective as claimed in claim 1, wherein the guide member comprises a pin.

9. A microscope objective as claimed in claim 1, wherein the adjusting ring comprises a knurled ring.

* * * * *